United States Patent [19]

Mock et al.

[11] 3,895,067

[45] July 15, 1975

[54] BORIC ACID RECOVERY

[75] Inventors: George H. Mock, Pensacola, Fla.;
Harold N. Simpson, Spartanburg, S.C.

[73] Assignee: Monsanto Company, St. Louis, Mo.

[22] Filed: Jan. 12, 1973

[21] Appl. No.: 323,196

Related U.S. Application Data

[63] Continuation-in-part of Ser. No. 46,295, June 15, 1970, abandoned, which is a continuation-in-part of Ser. No. 652,060, July 10, 1967, abandoned.

[52] U.S. Cl. ... 260/586 AB; 260/502.3; 260/462 A; 260/597 R; 260/631 B; 260/632 CB
[51] Int. Cl.$^2$............................................. C07C 45/02
[58] Field of Search ........ 260/586 B, 462 A, 631 B, 260/597 R, 502.3, 632 CB

[56] References Cited
UNITED STATES PATENTS 3,423,471  1/1969  Golden et al.................. 260/586 B
3,475,500  10/1969  Russell........................ 260/586 B

*Primary Examiner*—Norman P. Morgenstern
*Attorney, Agent, or Firm*—George R. Beck

[57] ABSTRACT

In a process wherein a saturated $C_4$ to $C_{20}$ hydrocarbon is oxidized in the presence of a boron compound and at least a portion of the resulting mixture is hydrolyzed and then separated into an organic phase and an aqueous phase containing ortho boric acid and carbonaceous impurities, the boric acid can be efficiently recovered for reuse in the process by crystallizing 35–75 percent of the boric acid from said aqueous phase for reuse in the oxidation reaction, recycling 85–99 percent of the aqueous residual liquid for reuse as the hydrolysis medium, removing water from the remaining residual liquid until the concentration of said impurities therein is substantially increased to more than 25 percent by weight and then crystallizing and removing additional boric acid from said remaining residual liquid.

8 Claims, 1 Drawing Figure

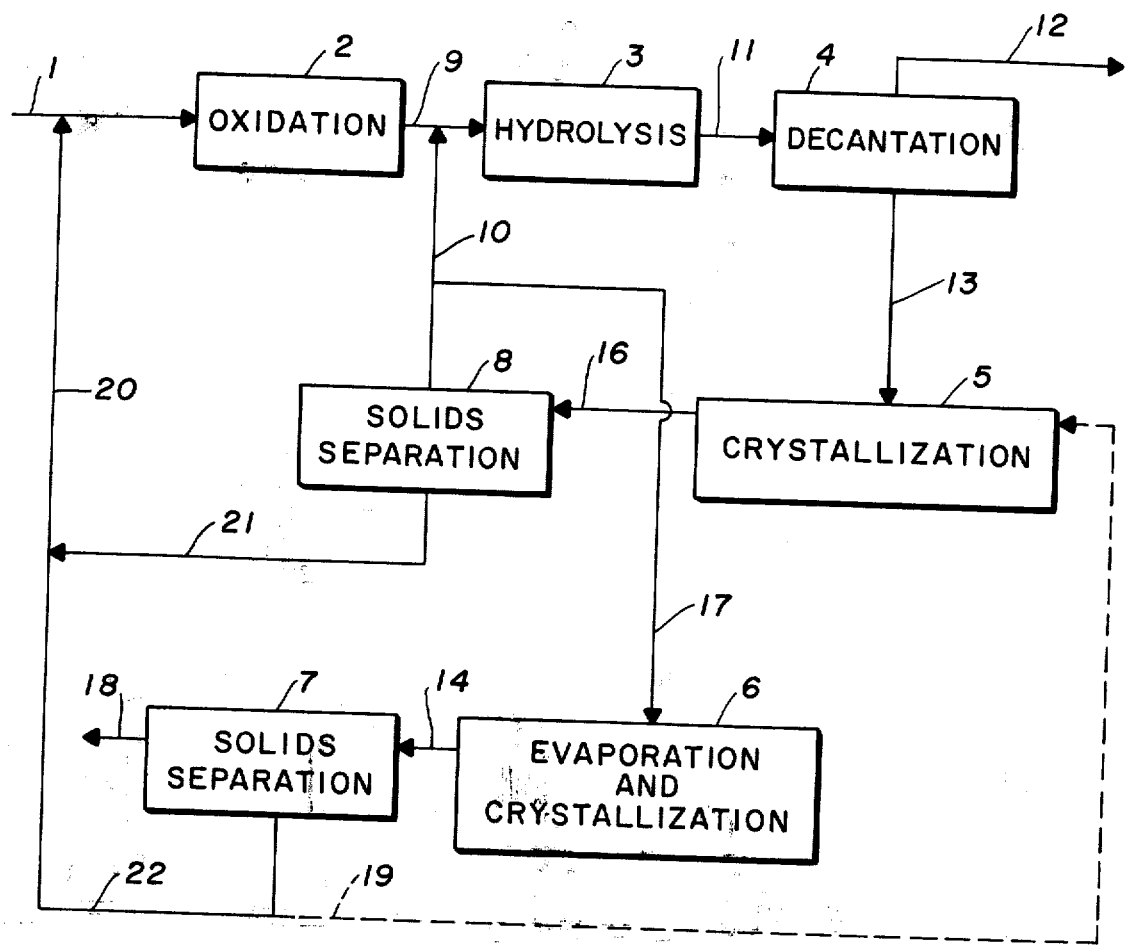

BORIC ACID RECOVERY

CROSS-REFERENCE TO RELATED APPLICATION

This application is a continuation-in-part of our co-pending application Ser. No. 46,295 which was filed on June 15, 1970. Application Ser. No. 46,295 was a continuation-in-part of our application Ser. No. 652,060 which was filed on July 10, 1967 both now abandoned.

BACKGROUND OF THE INVENTION

It is well known that various saturated hydrocarbons such as alkanes and cycloalkanes can be economically oxidized with molecular oxygen to produce alcohols and ketones which can then be further oxidized (e.g. with nitric acid) to form dicarboxylic acids that are useful in the manufacture of polyamides, polyesters, etc. It is also known that a high ratio of alcohol to ketone in the oxidation reaction products is generally very desirable and that improvement of that ratio can normally be achieved by carrying out the oxidation of the hydrocarbon in the presence of a boron compound that forms an ester with the hydrocarbon under the conditions of the oxidation reaction (e.g. ortho boric acid, a lower hydrate thereof or an ester of ortho boric acid or said lower hydrate) and then hydrolyzing the resulting mixture containing the borate ester of the hydrocarbon to convert the ester to the corresponding alcohol and ortho boric acid. A representative process is described in U.S. Pat. No. 3,243,449 granted to C. N. Winnick on Mar. 29, 1966.

In general, hydrolysis of the oxidation products provides a mixture having an organic phase containing the desired alcohol and ketone together with unreacted hydrocarbon and an aqueous phase containing ortho boric acid and minor amounts of relatively water-soluble carbonaceous impurities. In commercial practice, economic considerations require that as much as possible of the boric acid be recovered for reuse in the process. Theoretically, the most convenient technique would be to separate the aqueous and organic phases of the mixture, crystallize and separate the boric acid from the aqueous phase and recycle the separated crystalline boric acid for reuse in the oxidation reaction (usually after water-washing and then dehydration and/or esterification, if desired, to convert the boric acid to a lower hydrate thereof, an ester thereof or an ester of a lower hydrate thereof). However, the carbonaceous impurities in the aqueous phase of the mixture greatly complicate the recovery and reuse of the boric acid by that technique.

More specifically, the carbonaceous impurities in the aqueous phase of the hydrolyzed mixture tend to separate with the boric acid in relatively high proportions and, in a continuous process, soon reach a concentration in the recycled boric acid (generally at least about 3 percent) that substantially lowers the selectivity of the oxidation reaction when the recovered boric acid is reused in the reaction. The specific carbonaceous impurities that adversely affect the oxidation reaction selectivity have not been precisely identified but are believed to include oxidation reaction by-products such as, for example, adipic, glutaric, succinic and/or hydroxycaproic acids in the case of cyclohexane oxidation.

The proportions of the carbonaceous impurities that separate with the boric acid can be reduced (together with the need for substantially complete crystallization of the boric acid from the aqueous phase of the mixture) by carrying out the process with substantially more boric acid in the hydrolyzed mixture than is needed for recycle to the oxidation reaction, crystallizing only a portion of the boric acid from the aqueous phase of the mixture and recycling the residual aqueous boric acid-containing liquid for use as the hydrolysis medium. However, in a continuous process, the recycle of the carbonaceous impurities in that manner results in a gradual rise in the concentration of the impurities in the aqueous phase of the hydrolyzed mixture to levels (generally above about 5 percent by weight of the aqueous phase) at which the impurities again begin to separate with the boric acid in concentrations that would substantially lower the oxidation reaction selectivity on reuse of the recovered boric acid in the oxidation reaction.

Several solutions for the problem have been suggested. For example, in U.S. Pat. No. 3,232,704 granted Feb. 1, 1966, Helbig et al. propose extracting the carbonaceous impurities from the aqueous phase of the hydrolyzed mixture with an alcohol corresponding to the hydrocarbon oxidized in the process of that patent, but that approach has the disadvantage of resulting in the contamination of relatively large amounts of the principal product of the oxidation process and hence the need for repurification of that product. It has also been suggested that the carbonaceous impurities could be removed from the system by purging a substantial proportion of the liquid left after crystallization and separation of boric acid from the aqueous phase of the hydrolyzed mixture and replacing it with water and fresh boric acid. However, it has been found that purge rates adequate to maintain an economically acceptable oxidation reaction selectivity generally involve excessive and expensive losses of the boric acid.

In U.S. Pat. No. 3,475,500 granted Oct. 28, 1969, J. L. Russell suggests that before purging a portion of the liquid left after crystallization and separation of boric acid from the aqueous phase of the hydrolyzed mixture, that portion be further concentrated as by evaporation of water and then cooled to crystallize more of the boric acid contained therein. Consistent with the expectation that the level of contamination of the additional boric acid thereby crystallized would normally increase with the degree to which the liquid has been concentrated in contaminants before such additional crystallization, the patentee did not suggest concentrating that portion of the liquid very greatly before crystallizing more of the boric acid therefrom. However, and even at the relatively low degree of concentration disclosed by Russell, the additional boric acid thereafter crystallized was found to contain such a high proportion of the aforementioned carbonaceous impurities that even after water-washing of the crystalline acid, it cannot be returned directly to the oxidation reactor without sharply depressing the selectivities of the reaction.

In view of that disadvantage of the Russell procedure and the difficulties of the other processes mentioned hereinbefore, a process by which a substantially greater proportion of the boric acid in the hydrolyzed oxidation product mixture can be recovered with a substantially lower concentration of the aforementioned carbonaceous impurities is very desirable and it is an object of this invention to provide such a process.

SUMMARY OF THE INVENTION

It has now been discovered that the aforedescribed difficulties can be overcome to an unexpectedly great extent by a process in which the boric acid in the aqueous phase of the hydrolyzed mixture is crystallized and separated therefrom in a proportion within a specified range, a proportion of the residual aqueous boric acid-containing liquid within another specified range is recycled for use as the hydrolysis medium and additional boric acid is crystallized and recovered from the remaining aqueous residual liquid in surprisingly high proportion and purity after the water concentration of the remaining liquid has been substantially lowered so as to provide a concentrated aqueous residual liquid containing more than about 25 percent by weight of the carbonaceous impurities. More specifically, the present invention is an improvement in a process which comprises oxidizing a saturated $C_4$ to $C_{20}$ hydrocarbon in a reaction zone with molecular oxygen in the presence of ortho boric acid, a lower hydrate thereof or an ester of ortho boric acid or said lower hydrate; hydrolyzing at least a portion of the resulting mixture; separating the hydrolyzed mixture into an organic phase containing unreacted hydrocarbon and an alcohol and ketone corresponding to said hydrocarbon and an aqueous phase containing ortho boric acid and carbonaceous impurities; crystallizing and separating from said aqueous phase between about 35 and about 75 percent by weight of the ortho boric acid in said aqueous phase leaving an aqueous residual liquid containing between about 25 and about 65 percent of the ortho boric acid and at least about 85 percent by weight of the carbonaceous impurities from said aqueous phase; recycling the separated crystalline ortho boric acid, a lower hydrate thereof, an ester thereof or an ester of a lower hydrate thereof to said reaction zone; recycling between about 85 and about 99 percent by weight of said aqueous residual liquid to said hydrolysis zone whereby the concentration of said impurities in said aqueous phase during said crystallizing and separating of ortho boric acid from said aqueous phase is at least about 5 percent by weight; removing water from the remaining aqueous residual liquid until the concentration of said impurities therein is substantially increased; and then crystallizing and removing additional ortho boric acid from said remaining aqueous residual liquid; said improvement comprising carrying out the crystallizing and removing of additional boric acid after the concentration of said impurities in the remaining aqueous residual liquid has been increased to more than 25 percent by weight.

DESCRIPTION OF THE DRAWING AND EMBODIMENTS OF THE PROCESS

The invention will be more readily understood by reference to the following detailed description taken in conjunction with the accompanying drawing in which a schematic flow diagram is employed to represent a continuous system for oxidation of a hydrocarbon in the presence of a boron compound with recovery of boric acid in accordance with the process of this invention. In the system shown in the drawing, a liquid hydrocarbon having from four to 20 carbon atoms is charged through line 1 to an oxidation zone 2 in which it is oxidized in the presence of a boron compound that forms an ester with the hydrocarbon under the conditions of the oxidation reaction.

The boron compound can be ortho boric acid or a compound that forms ortho boric acid on contact with water, e.g. a $C_1$–$C_{20}$ alkyl or $C_3$–$C_{20}$ cycloalkyl ester of ortho boric acid (preferably a monoester or diester) of ortho boric acid or, more desirably, a lower hydrate of ortho boric acid (i.e., metaboric acid or boron oxide) or a $C_1$–$C_{20}$ alkyl or $C_3$–$C_{20}$ cycloalkyl ester of a lower hydrate of ortho boric acid. Mixtures of such boron compounds can also be employed.

The hydrocarbon can be any $C_4$ to $C_{20}$ straight-chain or branched-chain alkane such as, for example, n-butane, isobutane, n-pentane, isopentane, neopentane, n-hexane, a methylpentane, n-octane, n-decane, n-dodecane or eicosane or any $C_4$ to $C_{20}$ cycloalkane such as, for example, cyclobutane, cyclopentane, cyclohexane, cycloheptane, methylcyclohexane, a dimethyl cyclohexane, cyclooctane, cyclodecane, cyclododecane or cyclohexadecane. The process is most suitably employed in the oxidation of a $C_4$–$C_{12}$ cycloalkane and, in particular, cyclohexane, cyclodecane and cyclododecane. The hydrocarbon can be charged to the reaction in a relatively pure form or, if desired, with a diluent that does not interfere substantially to prevent the desired oxidation reaction. Other materials such as sulfur, nitrogen-containing compounds, etc. may also be present in the hydrocarbon feed in small amounts.

The oxidation of the hydrocarbon is carried out (preferably continuously) with the use of a gas containing molecular oxygen (for example air, air enriched with oxygen, or oxygen of commercial purity) at suitable oxidation reaction conditions until the desired degree of conversion is attained. The oxidation reaction is normally carried out so that between about 2 and about 25 percent (preferably less than 15 percent) of the hydrocarbon is oxidized in a single pass through the reaction zone. Typical oxidation temperatures are in the range of from about 120° to about 200°C and reaction pressures of from about one atmosphere to about 1000 psig (preferably 100 to 200 psig) can be employed with optimum conditions depending on the specific hydrocarbon being oxidized, the desired degree of conversion, etc.

At present, the most widely practiced embodiment of the hydrocarbon oxidation process is the air oxidation of cyclohexane to provide a mixture of cyclohexanol and cyclohexanone, and the process of this invention will be sometimes hereinafter described with particular reference to that embodiment, although it should be understood that the invention is not limited thereto but is applicable to any of the hydrocarbon starting materials mentioned hereinbefore.

During oxidation in the presence of the boron compound, the hydrocarbon is converted to the corresponding alcohol (or borate ester thereof) and ketone and small amounts of the aforementioned carbonaceous impurities. For example, in the case of cyclohexane oxidation, the effluent from the oxidation reaction zone 2 normally contains cyclohexyl borate, cyclohexanone, unreacted cyclohexane and small amounts of carbonaceous impurities which include by-products of the reaction (e.g. carboxylic acids such as adipic, glutaric, succinic and hydroxycaproic acids). The reaction zone effluent or a portion thereof is then hydrolyzed in a hydrolysis zone 3, in most cases to convert borate esters to the corresponding alcohol and ortho boric acid. In accordance with the present invention, the hydrolysis is carried out by contacting reaction zone effluent with an aqueous medium comprising a recycled portion (described more specifically hereinafter) of the aqueous boric acid-containing liquid remaining after crystallization of a portion of the boric acid in the aqueous phase of the hydrolyzed mixture and separation of the resulting crystalline boric acid from said aqueous phase. Water may be added to the hydrolysis medium as needed to replace that lost from the system in the process of this invention. Thereafter, the hydrolyzed mixture is separated (for example, in a decantation zone 4) into an organic phase containing the aforementioned alcohol, ketone and unreacted hydrocarbon and an aqueous phase which normally contains substantially all of the ortho boric acid from the hydrolyzed mixture, small amounts of the aforementioned alcohol and ketone and the carbonaceous impurities which, as aforesaid, tend to adversely affect the oxidation reaction selectivity if they are returned to the oxidation reaction zone in amounts as small as even 3 percent by weight of the boric acid recycled to the oxidation reaction.

By conventional techniques, a substantial proportion (usually up to about 75 percent by weight or more) of the boric acid in the decanted aqueous phase can be crystallized and separated therefrom in sufficiently high purity that it can be reused in the oxidation reaction without substantial adverse effect on the selectivity of the reaction. For example, the aqueous phase can be subjected to boric acid crystallization conditions in a crystallization zone 5 (optionally an evaporative crystallizer in which substantial water and nearly all of the alcohol and ketone in the aqueous phase can be driven off in vapor form before and/or during the crystallization of the boric acid) and the resulting crystalline boric acid can be separated from the resulting slurry in a solids separation zone 8 (e.g. a centrifuge) and thereafter recycled to oxidation zone 2 (preferably after water-washing of the crystals and dehydration and/or partial esterification, if desired, to convert the boric acid to a lower hydrate and/or ester thereof). The aqueous boric acid-containing residual liquid remaining after crystallization and separation of a portion (normally between about 35 and about 75 percent and in many cases between about 45 and about 65 percent by weight) of the boric acid in the aqueous phase of the hydrolyzed mixture generally contains at least about 85 percent by weight of the aforementioned carbonaceous impurities from the aqueous phase and is typically more concentrated in the carbonaceous impurities than said aqueous phase.

AS aforesaid, the aqueous residual liquid (normally containing between about 25 and about 65 percent and in most cases between about 35 and about 55 percent by weight of the boric acid from the aqueous phase of the hydrolyzed mixture) can be recycled to the hydrolysis zone 3 for use as the hydrolysis medium without causing an intolerable contamination of the boric acid that is crystallized from the aqueous phase of the hydrolyzed mixture if a substantial proportion thereof is continuously or periodically withdrawn from the system and replaced with water and fresh boric acid. However, as noted hereinbefore, the proportion of the residual liquid that must be withdrawn and replaced to avoid an excessive concentration of the carbonaceous impurities in the hydrolyzed mixture (usually more than about 5 percent by weight of the hydrolyzed mixture) is generally of such great magnitude that replacement of the boric acid thus withdrawn from the system is a substantial economic burden on the process.

It has been supposed, on the other hand, that crystallization of significant amounts of additional boric acid from the withdrawn portion of the residual liquid would require a prior substantial lowering of the concentration of water therein and that removal of substantial water for that purpose would increase the relative concentration of the less volatile carbonaceous impurities which would then tend to separate with the boric acid in even higher proportion. However, it has now been discovered that in accordance with the present invention, at least aboout 85 percent and in some cases up to about 99 percent by weight of the residual liquid can be recycled to the hydrolysis zone 3 without causing an intolerable concentration of the carbonaceous impurities in the hydrolyzed mixture and a high proportion of additional boric acid can be crystallized and recovered in surprisingly high purity from the remaining portion of the residual liquid if the crystallizing and removing of additional boric acid is carried out after the concentration of said impurities in the remaining aqueous residual liquid has been increased to more than 25 percent by weight.

In the embodiment shown in the drawing, the present invention is carried out by feeding between about 1 and about 15 percent by weight of the aqueous residual liquid from solids separation zone 8 to an evaporation and crystallization zone 6 in which the concentration of water therein is substantially lowered, preferably to not more than about 60 percent by weight, and the concentration of the relatively non-volatile carbonaceous impurities therein is increased to more than 25 percent by weight. In most cases, such evaporation will also raise the boric acid concentration to at least about 10 percent by weight. Thereafter, a substantial proportion and in most cases from at least about 50 up to 70 percent or even substantially more of the boric acid in the concentrated residual liquid can be crystallized with a sufficiently low concentration of carbonaceous impurities that after separation from the resulting slurry in a solids separation zone 7, it can commonly be directly recycled to oxidation zone 2 (after dehydration and/or partial esterification if the use of a lower hydrate and/or ester of the boric acid in the oxidation reaction is desired) without substantial adverse effect on the selectivity of the oxidation reaction.

If desired, the boric acid crystals thus recovered can be washed with water or an aqueous solution of boric acid (e.g. during or after separation in solids separation zone 7) to lower the carbon concentration thereof even further. Such washing can be carried out until the carbonaceous impurity level of the recovered boric acid has been reduced to virtually and desired level, although use of the wash water or solution in a ratio of not more than about 0.5–1 times the weight of the boric acid will generally be sufficient to lower the impurities concentration therein to not more than about one half of one percent by weight. Alternatively, and either after or without such washing, the recovered boric acid crystals from solids separation zone 7 can be returned to crystallization zone 5 for recycle to oxidation zone 2 and/or hydrolysis zone 3 together with the boric acid normally thus recycled from solids separation zone 8.

In a more specific embodiment of the process shown in the drawing, cyclohexane and a boron compound such as meta boric acid are fed to oxidation zone 2 via line 1 and contacted therein with a gas containing molecular oxygen and at an elevated oxidation reaction temperature. The resulting mixture containing cyclohexyl borate, cyclohexanone, unreacted cyclohexane and the aforementioned carbonaceous impurities is passed through line 9 into hydrolysis zone 3 in which it is hydrolyzed by contact with an aqueous medium introduced through line 10. IN hydrolyzer 3, the cyclohexyl borate to cyclohexanol and ortho boric acid and the hydrolyzed mixture is passed through line 11 into decanter 4 in which the mixture separates into a heavier aqueous phase containing substantially all of the boric acid from the hydrolyzed mixture, small proportions of cyclohexanol and cyclohexanone and at least about 5 percent (typically at least about 12 percent) by weight of the carbonaceous impurities and a lighter organic phase containing cyclohexanol, cyclohexanone, and unreacted cyclohexane. The organic phase is removed via line 12 and treated in accordance with known procedures for recovery of cyclohexanol and cyclohexanone.

The aqueous phase from decanter 4 passes through line 13 into crystallization zone 5 (preferably an evaporative crystallizer) and the resulting slurry is transported via line 16 to solids separation zone 8 (e.g. a centrifuge) in which the crystallized boric acid is separated for recycle to oxidation zone 2 via lines 20 and 21. The aqueous residual liquid from solids separator 8 is divided into two portions, the larger of which (at least about 85 percent and preferably at least about 92 percent by weight of the aqueous residual liquid) is returned to hydrolysis zone 3 via lines 9 and 10 for use as the hydrolysis medium.

The remaining portion of the aqueous residual liquid from separator 8 is passed through line 17 to an evaporation and crystallization zone 6 in which, in accordance with the process of this invention, a substantial proportion of its water content is evaporated to provide a concentrated aqueous boric acid-containing liquid containing more than 25 percent by weight (usually at least about 30 percent but preferably not more than about 50 percent by weight) of the carbonaceous impurities and the concentrated aqueous residual liquid is cooled to crystallize a major proportion (desirably at least about 70 percent by weight) of the boric acid contained therein. The resulting slurry is transported through line 14 to solids separator 7 (preferably a centrifuge) for separation of the boric acid crystals from the remaining highly carbonaceous liquid which can be withdrawn from the system through line 18 and discarded. The crystalline boric acid thereby recovered normally contains between about 0.5 and about 5 percent by weight of the carbonaceous impurities, of which about 50 percent by weight is carbon. In most cases, (e.g. when the content of such impurities is less than about 3 percent by weight) the boric acid thereby recovered is most conveniently recycled to oxidation zone 2 via lines 22 and 20 (after dehydration and/or esterification, if desired). In other instances (e.g. when the content of such impurities is at least about 3 percent by weight) the recovered acid can be further purified before it is returned to oxidation zone 2, e.g. by washing with water or an aqueous solution of boric acid in any manner suitable for removing enough of the impurities to lower their concentration in the recovered acid to less than about 3 percent by weight. Alternatively, a portion or all of the recovered boric acid crystals from solids separator 7 can be returned to crystallization zone 5 via line 19 and thereby recycled to oxidation zone 2 and/or hydrolysis zone 3 together with the boric acid normally thus recycled from solids separator 8.

The following examples are included to illustrate the advantages of the process of this invention and are not intended to be representative of any limitation on the scope of the invention. Percentages are by weight except where noted otherwise.

EXAMPLE I

Cyclohexane was oxidized in a continuous process by contact with air in the presence of meta-boric acid and the resulting mixture containing cyclohexyl borate, cyclohexanone, unreacted cyclohexane and carbonaceous impurities including adipic, glutaric, succinic and hydroxycaproic acids was substantially completely hydrolyzed with an aqueous medium containing about 9 percent of boric acid and about 15.5 percent of the carbonaceous impurities in the mannner described hereinbefore. The hydrolyzed mixture was separated by decantation into an organic phase containing cyclohexanol, cyclohexanone and unreacted cyclohexane and an aqueous phase containing substantially all of the boric acid from the hydrolyzed mixture, substantially no borate ester and about 16 percent of the carbonaceous impurities. Approximately 55 percent of the boric acid in the aqueous phase was separated therefrom by crystallization and filtration, providing a cake which, after water-washing, contained less than 2 percent of the carbonaceous impurities leaving an aqueous residual liquid containing 7.62 percent boric acid, 62.2 percent water and about 17.3 percent carbonaceous impurities (more than 85 percent of the carbonaceous impurities from the aqueous phase). About 97 percent by weight of the aqueous residual liquid was recycled for use as the aqueous hydrolysis medium. A 1485-gram portion of the remaining 3 percent of the residual liquid was heated at 47°C. under a vacuum of 60 millimeters of mercury until 65 percent of the water (600 milliliters) had been removed by evaporation. The resulting concentrated aqueous residue, which had a carbonaceous impurities concentration of approximately 45 percent, was cooled to 20°C. and boric acid thus crystallized was recovered by vacuum filtration. It was found that 76.2 percent of the boric acid from the 1485-gram portion of residual liquid had been recovered with a carbonaceous impurities content of 5 percent. The recovered boric acid was then slurried in four times its weight of water saturated with boric acid for 15 minutes at 25°C. and refiltered. The refiltered product included 74.5 percent of the boric acid from the 1485-gram portion of residual liquid and was substantially devoid of carbon.

EXAMPLE II

In a continuous operation, cyclohexane oxidation, hydrolysis of the resulting borate ester-containing mixture, separation of the hydrolyzed mixture into aqueous and organic phases, crystallization and separation of about 55 percent of the boric acid in the aqueous phase and recycle of about 97 percent of the aqueous residual liquid for use as the hydrolysis medium were carried out substantially as described in Example I. The remaining 3 percent of the aqueous residual liquid was heated at 103°C. and atmospheric pressure until its water concentration had been lowered by about 50 percent. The resulting concentrated residual liquid, which had a carbonaceous impurities content approximately 35 percent, was cooled to crystallize boric acid which was separated from the resulting slurry by filtration. It was found that 58.8 percent of the boric acid in the concentrated residual liquid had been recovered with a carbonaceous impurities content of about 0.8 percent. The recovered boric acid was returned to the aqueous phase in crystallizer 5. Approximately 45 percent of the boric acid from crystallizer 5 was returned to the hydrolysis zone in the recycled portion of the aqueous residual liquid, and the other 55 percent was returned to the oxidation zone after suitable dehydration. Boric acid thus recovered from the concentrated residual liquid was continuously recycled through the oxidation zone without substantially lowering the selectivity of the oxidation reaction.

EXAMPLE III

The procedure of Example II was repeated with the exception that 76.4 percent of the boric acid in the concentrated residual liquid was recovered with a carbonaceous impurities content of 1.1 percent. The boric acid thus recovered was continuously recycled through the oxidation zone without substantially lowering the selectivity of the oxidation reaction.

COMPARATIVE EXAMPLE A

When water was removed by evaporation at 48°C from an aqueous residual liquid of the type processed in Example I until the carbonaceous impurities concentration in the liquid was increased to about 60 percent and the concentrated residual liquid was then cooled, the resulting crystalline boric acid was heavily coated with a viscous carbonaceous oil that was not soluble in water or the recycled hydrolysis medium and therefor represented a potentially severe fouling hazard for equipment in which the boric acid thereby recovered would be purified and/or reused.

We claim:

1. In a process which comprises oxidizing a saturated $C_4$ to $C_{20}$ hydrocarbon in a reaction zone with molecular oxygen in the presence of ortho boric acid, a lower hydrate thereof or an ester or ortho boric acid or said lower hydrate; hydrolyzing at least a portion of the resulting mixture; separating the hydrolyzed mixture into an organic phase containing unreacted hydrocarbon and an alcohol and ketone corresponding to said hydrocarbon and an an aqueous phase containing ortho boric acid and carbonaceous impurities; crystallizing and separating from said aqueous phase between about 35 and about 75 percent by weight of the ortho boric acid in said aqueous phase leaving an aqueous residual liquid containing between about 25 and about 65 percent of the ortho boric acid and at least about 85 percent by weight of the carbonaceous impurities from said aqueous phase; recycling the separated ortho boric acid, a lower hydrate thereof, an ester thereof or an ester of a lower hydrate thereof to said reaction zone; recycling between about 85 and about 99 percent by weight of said aqueous residual liquid to said hydrolysis zone whereby the concentration of said impurities in said aqueous phase during said crystallizing and separating of ortho boric acid from said aqueous phase is at least about 5 percent by weight; evaporating water from the remaining aqueous residual liquid until the concentration of said impurities therein is substantially increased; and then crystallizing and removing additional boric acid from said remaining aqueous residual liquid; the improvement which comprises carrying out the crystallizing and removing of additional boric acid after the concentration of said impurities in the remaining aqueous residual liquid has been increased to between about 30 and about 50 percent by weight.

2. The process of claim 1 wherein the additional boric acid thereby crystallized and removed is at least about 70 percent by weight of the boric acid in said remaining aqueous residual liquid.

3. The process of claim 1 wherein the hydrocarbon is a $C_4$ to $C_{12}$ cycloalkane.

4. The process of claim 3 wherein the additional boric acid thereby crystallized and removed is at least about 70 percent by weight of the boric acid in said remaining aqueous residual liquid.

5. The process of claim 1 wherein the hydrocarbon is cyclohexane.

6. The process of claim 5 wherein the additional boric acid thereby crystallized and removed is at least about 70 percent by weight of the boric acid in said remaining aqueous residual liquid.

7. In a process which comprises oxidizing cyclohexane in a reaction zone with molecular oxygen in the presence of a lower hydrate of ortho boric acid; hydrolyzing the resulting mixture containing cyclohexyl borate, cyclohexanone, unreacted cyclohexane and carbonaceous impurities in a hydrolysis zone to convert the cyclohexyl borate to cyclohexanol and ortho boric acid; separating the hydrolyzed mixture into an organic phase containing cyclohexanol, cyclohexanone ann unreacted cyclohexane and an aqueous phase containing ortho boric acid and said impurities; crystallizing and separating from said aqueous phase between about 35 and about 75 percent by weight of the ortho boric acid in said aqueous phase leaving an aqueous residual liquid containing between about 25 and about 65 percent of the ortho boric acid and at least about 85 percent by weight of the carbonaceous impurities from said aqueous phase; recycling the separated ortho boric acid, a lower hydrate thereof, an ester thereof or an ester of a lower hydrate thereof to said reaction zone; recycling between about 95 and about 99 percent by weight of said aqueous residual liquid to said hydrolysis zone whereby the concentration of said impurities in said aqueous phase during said crystallizing and separating of ortho boric acid from said aqueous phase is at least about 12 percent by weight; evaporating water from the remaining aqueous residual liquid until the concentration of said impurities therein is substantially increased; and then crystallizing and removing additional boric acid from said remaining aqueous residue; the improvement which comprises carrying out the crystallizing and removing of additional boric acid after the concentration of said impurities in the remaining aqueous residual liquid has been increased to between about 30 and about 50 percent by weight.

8. The process of claim 7 wherein the additional boric acid thereby crystallized and removed is at least about 70 percent by weight of the boric acid in said remaining aqueous residual liquid.

* * * * *

UNITED STATES PATENT AND TRADEMARK OFFICE
CERTIFICATE OF CORRECTION

PATENT NO. : 3,895,067

DATED : July 15, 1975

INVENTOR(S) : George H. Mock
Harold N. Simpson

It is certified that error appears in the above-identified patent and that said Letters Patent are hereby corrected as shown below:

Column 9, line 45 (in Claim 1), between "ester" and "ortho", "or" should read --of--.

Signed and Sealed this sixth Day of January 1976

[SEAL]

Attest:

RUTH C. MASON
Attesting Officer

C. MARSHALL DANN
Commissioner of Patents and Trademarks